(12) United States Patent
Mercier

(10) Patent No.: US 9,988,940 B2
(45) Date of Patent: Jun. 5, 2018

(54) LATCHING ACTUATION MECHANISM FOR NACELLE MOUNTED LATCHING SYSTEM

(71) Applicant: United Technologies Corporation, Hartford, CT (US)

(72) Inventor: Claude Mercier, Vernon, CT (US)

(73) Assignee: United Technologies Corporation, Hartford, CT (US)

( * ) Notice: Subject to any disclaimer, the term of this patent is extended or adjusted under 35 U.S.C. 154(b) by 295 days.

(21) Appl. No.: 14/765,424

(22) PCT Filed: Mar. 11, 2014

(86) PCT No.: PCT/US2014/022918
§ 371 (c)(1),
(2) Date: Aug. 3, 2015

(87) PCT Pub. No.: WO2014/197029
PCT Pub. Date: Dec. 11, 2014

(65) Prior Publication Data
US 2015/0369083 A1    Dec. 24, 2015

Related U.S. Application Data

(60) Provisional application No. 61/781,467, filed on Mar. 14, 2013.

(51) Int. Cl.
| | |
|---|---|
| *F02K 1/76* | (2006.01) |
| *B64D 29/08* | (2006.01) |
| *F01D 25/24* | (2006.01) |
| *F02K 3/06* | (2006.01) |
| *B64D 29/06* | (2006.01) |
| *F01D 25/28* | (2006.01) |

(52) U.S. Cl.
CPC ............ *F01D 25/24* (2013.01); *B64D 29/06* (2013.01); *F01D 25/28* (2013.01); *F02K 3/06* (2013.01); *F05D 2230/72* (2013.01); *F05D 2240/14* (2013.01)

(58) Field of Classification Search
CPC .................. F01D 25/24; Y10T 403/59; Y10T 403/32541; F02K 1/766; B64D 29/08; F05D 2240/14; F05D 2230/72
USPC ........................................................ 415/126
See application file for complete search history.

(56) References Cited

U.S. PATENT DOCUMENTS

| | | | | |
|---|---|---|---|---|
| 2,564,530 A | * | 8/1951 | Guery .................... | B64D 29/06 123/41.7 |
| 4,399,966 A | * | 8/1983 | Crudden ................ | B64D 29/08 244/129.4 |

(Continued)

FOREIGN PATENT DOCUMENTS

WO    2010066958 A1    6/2010

OTHER PUBLICATIONS

The International Search Report dated Dec. 17, 2014 for International application No. PCT/US2013/022918.

(Continued)

*Primary Examiner* — Deming Wan
(74) *Attorney, Agent, or Firm* — Kinney & Lange, P.A.

(57) ABSTRACT

An assembly for a gas turbine engine includes a first fan cowl pivotable on a hinge from a first position to a second position. A latching actuation mechanism is disposed under the nacelle, engages the hinge, and is actuated by movement of the hinge between the first position and the second position.

18 Claims, 4 Drawing Sheets

(56) References Cited

U.S. PATENT DOCUMENTS

| | | | |
|---|---|---|---|
| 4,549,708 A * | 10/1985 | Norris | B64D 29/06 244/129.4 |
| 4,585,189 A * | 4/1986 | Buxton | B64D 29/08 244/129.4 |
| 4,613,099 A | 9/1986 | Smith et al. | |
| 4,629,146 A | 12/1986 | Lymons | |
| 4,679,750 A | 7/1987 | Burhans | |
| 4,825,644 A | 5/1989 | Bubello | |
| 5,350,136 A | 9/1994 | Prosser et al. | |
| 5,524,847 A | 6/1996 | Brodell et al. | |
| 5,623,820 A | 4/1997 | Balzer et al. | |
| 5,826,823 A | 10/1998 | Lymons et al. | |
| 8,122,702 B2 | 2/2012 | Tsou et al. | |
| 8,627,644 B2 * | 1/2014 | Vauchel | B64D 29/08 60/226.2 |
| 8,641,370 B2 * | 2/2014 | Provost | B64D 29/06 415/127 |
| 8,721,283 B2 * | 5/2014 | Swift | B64C 11/308 415/26 |
| 2009/0129922 A1 | 5/2009 | Cloft et al. | |
| 2011/0091317 A1 * | 4/2011 | Regard | B64D 29/08 415/201 |
| 2011/0113837 A1 | 5/2011 | Soulier et al. | |
| 2011/0297787 A1 | 12/2011 | Guillaume et al. | |
| 2013/0255225 A1 | 10/2013 | Charron et al. | |
| 2013/0323013 A1 | 12/2013 | Mercier et al. | |

OTHER PUBLICATIONS

Extended European Search Report, for European Patent Application No. 14807366.1, dated Feb. 19, 2016, 8 pages.

* cited by examiner

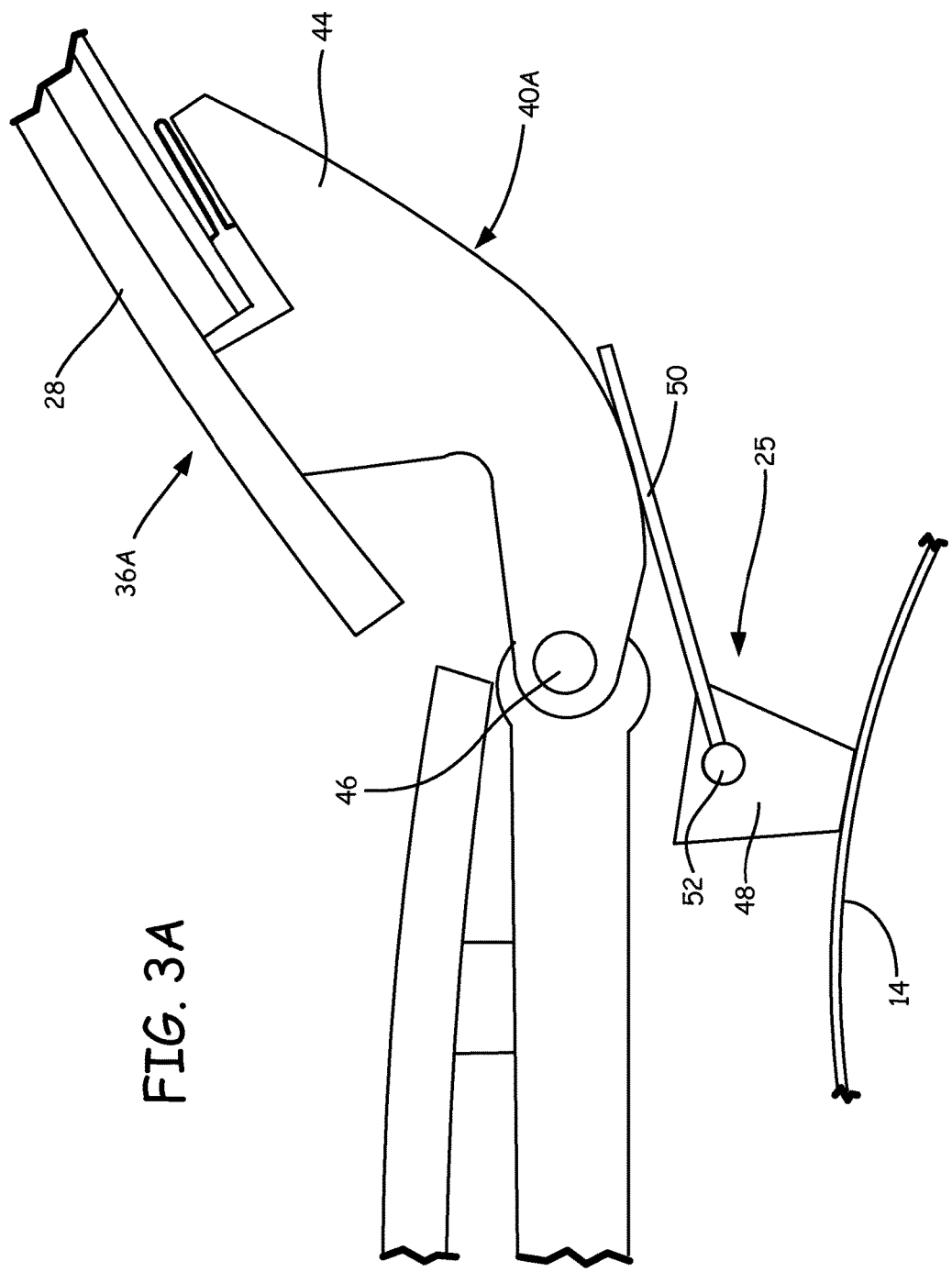

LATCHING ACTUATION MECHANISM FOR NACELLE MOUNTED LATCHING SYSTEM

CROSS-REFERENCE TO RELATED APPLICATION(S)

This application claims the benefit of U.S. Provisional Application No. 61/781,467 filed Mar. 14, 2013 for "LATCHING ACTUATION MECHANISM FOR NACELLE MOUNTED LATCHING SYSTEM" by Claude Mercier and claims the benefit of PCT application PCT/US2014/022918 filed Mar. 11, 2014, for "LATCHING ACTUATION MECHANISM FOR NACELLE MOUNTED LATCHING SYSTEM" by Claude Mercier.

BACKGROUND

This disclosure relates to gas turbine engines, and in particular, to a latching actuation mechanism for a latching system of a gas turbine engine nacelle.

One type of gas turbine engine includes a fan nacelle surrounding a core nacelle. The core nacelle encloses a core of the engine. The core drives a fan arranged in a bypass flowpath. The bypass flowpath is provided between core and fan nacelles.

The core nacelle encloses a core compartment that houses pressurized conduits, such as compressed air ducts for aircraft Environmental Control System (ECS). While the bypass flow pressure in the bypass flowpath aids in maintaining an inner flow structure in a closed and sealed position around the core flowpath, if a high pressure conduit bursts, the pressure within the core compartment may increase and separate a leading edge of the inner flow structure from its mating structure. In this condition, bypass flow may leak past the inner flow structure into the core compartment. This may destroy and dislodge portions of the core and fan nacelles.

To this end, latching assemblies have been proposed. These assemblies maintain the leading edge of the inner flow structure in a fully closed position. Latching assemblies can be rather complex, can on occasion become stuck, and may be susceptible to human error. If the latching assembly becomes stuck this requires the surrounding nacelle structure to be disassembled and removed to gain access to the stuck latch.

SUMMARY

An assembly for a gas turbine engine includes a first fan cowl pivotable on a hinge from a first position to a second position. A latching actuation mechanism is disposed under the nacelle, engages the hinge, and is actuated by movement of the hinge between the first position and the second position.

A gas turbine engine includes a fan case, a nacelle, a latching actuation mechanism, and a latch. The nacelle includes a first fan cowl pivotable on a first hinge. Additionally, the nacelle includes a second fan cowl pivotable on a second hinge. The first and second hinges pivot the first and second fan cowls from a first position to a second position. The latching actuation mechanism is disposed between the fan case and the first fan cowl and engages the first hinge. The latching actuation mechanism is actuated in response to movement of the hinge between the first position and the second position. Movement of the latching actuation mechanism in response to the hinge rotates the latch between a latched position and an unlatched position.

A method of opening a nacelle includes pivoting a fan cowl on a hinge, actuating a latching actuation mechanism in response to the pivoting of the hinge of the fan cowl, and pivoting a latch from a latched position to an unlatched position in response to movement of the latching actuation mechanism.

BRIEF DESCRIPTION OF THE DRAWINGS

FIG. 3A is a plane view with the fan cowl raised to the open position and the latching actuation mechanism engaging a hinge of the nacelle.

DETAILED DESCRIPTION

An assembly for a gas turbine engine includes a fan case, a nacelle, and a latching actuation mechanism. The nacelle has a fan cowl pivotable on hinges from a closed position (where the fan cowl is positioned around the fan case) to an open position for maintenance. In some embodiments, a fan duct and/or thrust reverser cowl is positioned just aft of the fan cowl and requires the fan cowl to be opened before it is opened for engine maintenance. The latching actuation mechanism is disposed under one of the fan cowl hinges, and is actuated by the motion of fan cowl hinge(s) between a first position (such as when the fan cowl is in a closed position) and a second position (such as when the fan cowl is in an open position). The latching actuation mechanism can actuate the fan duct and/or thrust reverser cowl latch assembly to allow for access for engine maintenance. As a result of the actuation of the latching actuation mechanism by the hinges, actuation of the thrust reverser latching mechanism is done automatically by the mechanic's opening of the fan cowl ensuring that the thrust reverser cowl is disengaged prior to its opening.

Figure 1:
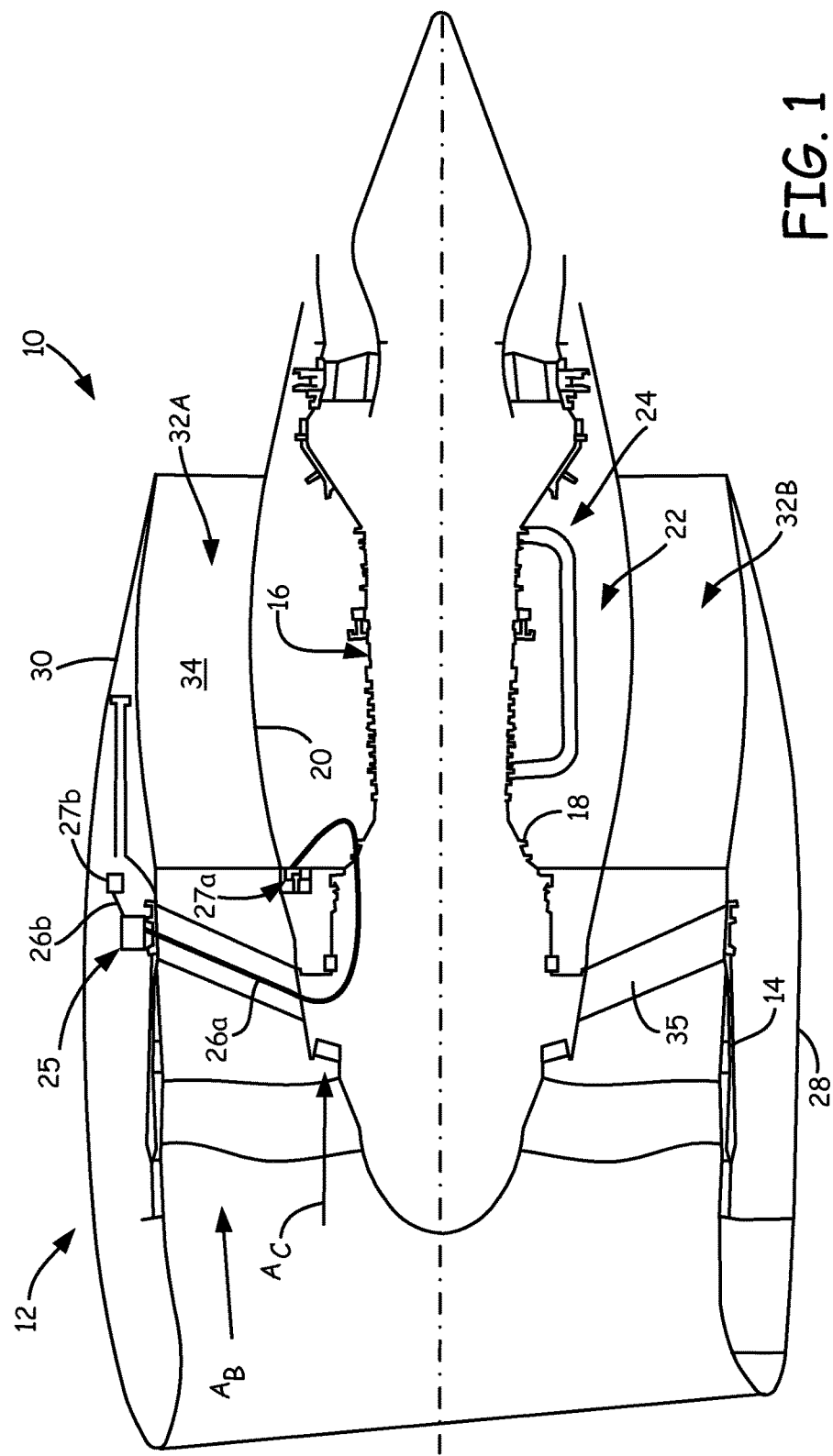
FIG. 1 is a cross section of a schematic gas turbine engine showing one embodiment of a latching system for a nacelle.

FIG. 1 illustrates one embodiment of gas turbine engine 10. Gas turbine engine 10 includes nacelle 12, fan case 14, core 16, intermediate case 18, fan duct inner fixed structure 20, core compartment 22, compressed air duct 24, latching actuation mechanism 25, linking members 26, and latching assembly 27. Nacelle 20 includes fan cowl 28, thrust reverser cowl 30 and upper and lower bifurcations 32A and 32B.

The construction and operational characteristics of gas turbine engine 10 are known, and therefore, will not be described in great detail. In the embodiment shown in the FIGURES, gas turbine engine 10 is a high bypass ratio turbofan gas turbine engine but the invention is applicable to other types of gas turbine engines. As used herein, terms such as "front", "forward", "aft", "rear", "rearward" should be understood as positional terms in reference to the direction of airflow $A_C$ and $A_B$ through gas turbine engine 10.

Fan cowl 28 encloses fan case 14. Core 16 is a static structure generally comprised of several sub-structures and is often referred to as the engine backbone. One of such sub-structures is intermediate case 18, which encloses portions of compressor section of gas turbine engine 10 aft of fan case 14.

Inner fixed structure 20 of fan duct 34 surrounds the core 16 and defines core compartment 22. Various components may be provided in the core compartment 22, such as fluid conduits, or compressed air duct 24. Compressed air duct 24 is under high pressure and may supply compressed air from a higher pressure compressor stage to a lower pressure turbine stage for cooling. Compressed air from core 16 can additionally be used in an ECS of an aircraft.

In FIG. 1, latching actuation mechanism 25 is disposed adjacent fan cowl 28 between fan cowl 28 and fan case 14 near the top dead center of gas turbine engine 10. Latching actuation mechanism 25 is connected to one or more linkage members 26a and 26b. Linkage member 26a extends through fan exit guide vane 35 and connects to latching assembly 27a. Latching assembly 27a is positioned forward of intermediate case 18 and latches inner fixed structure 20 to engine 10. In some embodiments, latching assembly 27a can latch first and second halves of fan duct inner fixed structure 20 to fan case 14 and/or intermediate case 18. Additionally, latching actuation mechanism 25 is connected to linkage member 26b, which extends through nacelle 12 and connects to latching assembly 27b for thrust reverser cowl 30. Latching actuation mechanism 25 can actuate latch assembly 27b to allow for access for engine maintenance. As a result of the actuation of latching actuation mechanism 25, actuation of latching mechanism 27b for thrust reverser cowl 30 is done automatically by a mechanic's opening of fan cowl 28 ensuring that thrust reverser cowl 30 is disengaged prior to its opening.

In one embodiment, linkage members 26a and 27b comprise push-pull cables surrounded by sheaths. Latching actuation mechanism 25 acts as a lever and fulcrum to push and pull cables to actuate latching assemblies 27a and 27b as desired. Systems utilizing such cables are described in further detail in U.S. Pat. Nos. 5,350,136 and 4,549,708, which are incorporated herein by reference. In other embodiments, the cables described can be substituted for rods, hydraulic, electronic, or other linkage components. In one embodiment, latching assemblies 27a and 27b utilize hooks. In other embodiments, other latching actuation mechanisms such as insertable and retractable pins can be utilized in addition to or in alternative to hooks. One system utilizing hooks to latch halves of fan duct inner fixed structure 20 is disclosed in co-pending application Ser. No. 13/488,483, filed Jun. 5, 2012, entitled "Nacelle Inner Flow Structure Leading Edge Latching System", the disclosure of which is incorporated herein by reference.

Fan cowl 28 of nacelle 12 aft of fan exit guide vanes 35 includes thrust reverser cowl 30. Thrust reverser cowl 30, fan cowl 28, fan duct inner fixed structure 20, and upper and lower bifurcations 32A, 32B, collectively form portions of fan duct 34 that receives bypass flow. In the embodiment of FIG. 1, thrust reverser cowl 30 is positioned aft of fan cowl 28.

As will be described in further detail subsequently, latching actuation mechanism 25 operates to latch and unlatch latching assembly 27a via linkage member 26a when fan cowl 28 is opened and closed. With latching assembly 27a unlatched, first fan duct inner fixed structure 20 can be moved relative to second fan duct inner fixed structure 20 and fan case 14 to allow access to core 16. In one embodiment, when engine 10 is on the ground and fan cowl 28 is opened, latching actuation mechanism 25 actuates latching assembly 27a so latching assembly 27a is unlatched and fan duct 34 can be opened. In another embodiment, fan cowl 28 is closed, latching actuation mechanism 25 actuates latching assembly 27a so latching assembly 27a is latched and fan duct inner fixed structure 20 is engaged and sealed.

Figure 2:
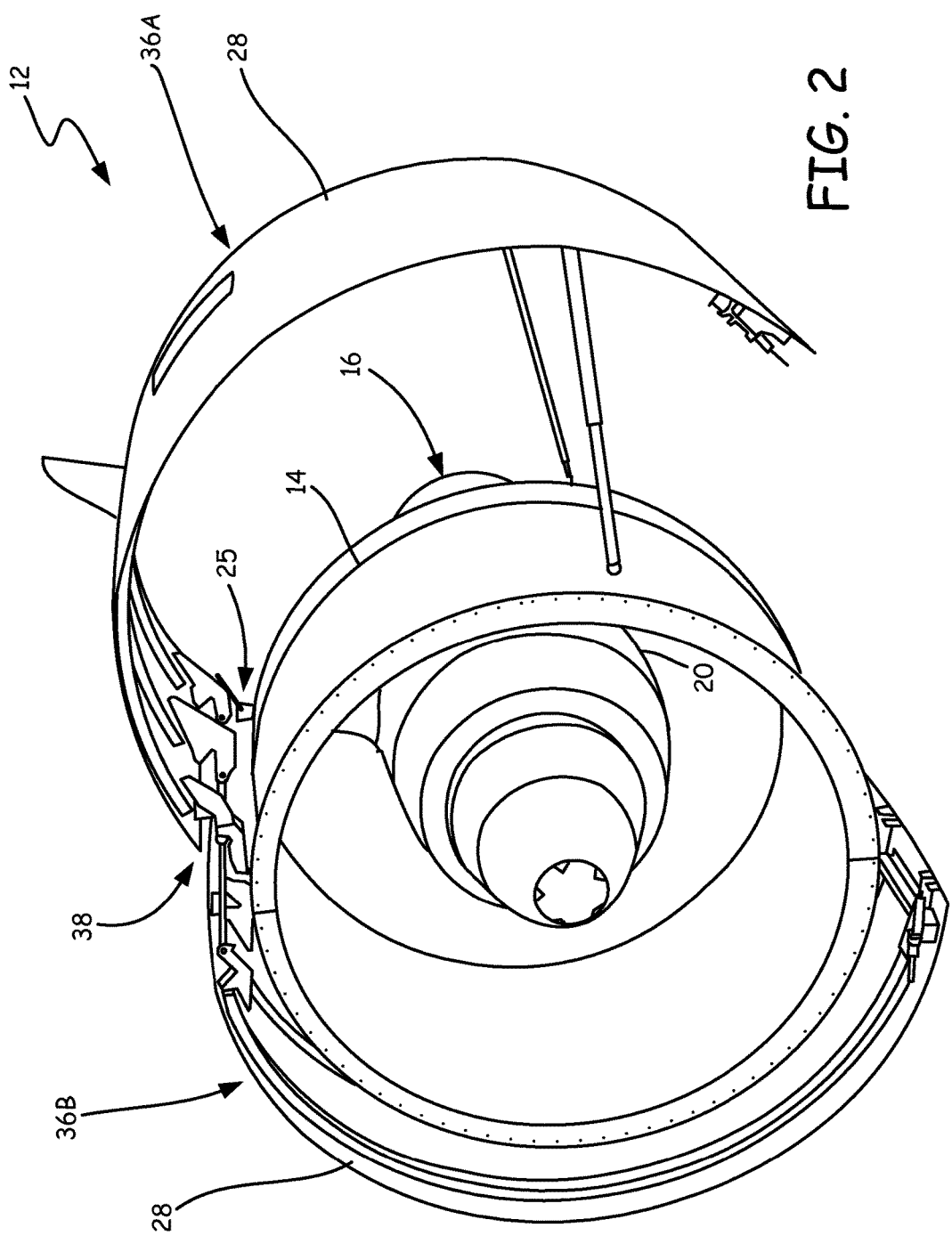
FIG. 2 is a semi-exploded perspective view of the nacelle with a fan cowl of the nacelle raised to an open position.

FIG. 2 shows a semi-exploded view of gas turbine engine 10 from a forward position. Gas turbine engine 10 of FIG. 2, includes nacelle 12, fan case 14, core 16, inner fixed structure 20, fan duct 34, latching actuation mechanism 25, and fan cowl 28. Fan cowl 28 is divided in halves typically called doors 36A and 36B. FIG. 2 shows hinge assembly 38 that includes hinge 40A.

As shown in FIG. 2, fan cowl 28 is split into doors 36A and 36B along upper and lower bifurcations 32A and 32B (FIG. 1). Doors 36A and 36B are connected to hinge assembly 38. Hinge assembly 38 is fastened or otherwise connected to pylon superstructure (not shown). Hinge 40A is connected to door 36A. Latching actuation mechanism 25 is mounted on fan case 14. As shown in FIG. 2, latching actuation mechanism 25 engages hinge 40A. Fan cowl 28 typically rests on top of fan duct at an aft portion to ensure fit and minimized aero dynamic disturbances, therefore fan cowl 28 must be opened before fan duct 34 (FIG. 1) can be opened.

Doors 36A and 36B are disposed to either side of fan case 14. Doors 36A and 36B pivot on hinge assembly 38 to an open position (as shown with door 36A in FIG. 2) and expose fan duct 34 (FIG. 1) and inner fixed structure 20. Similarly, fan duct inner fixed structure 20 can be unlatched and opened to expose core 16 and other components of gas turbine engine 10 for assembly, maintenance or engine removal and replacement.

FIG. 3A shows latching actuation mechanism 25 in further detail. In FIG. 3A, door 36A of fan cowl 28 is in the open position similar to in FIGS. 2A and 2B. Hinge 40A includes beam 44 and joint 46. Latching actuation mechanism 25 includes bracket 48, pivot arm 50, and joint 52.

As shown in FIG. 3A, beam 44 extends away from joint 46. Beam 44 pivots around joint 46 as door 36A opens and closes. Bracket 48 is mounted on the outer diameter of fan case 14 adjacent door 36A. Thus, latching actuation mechanism 25 is disposed between fan case 14 and fan cowl 28 of door 36A. In the embodiment shown, bracket 48 comprises a stationary body that lever arm 50 can pivot relative to at joint 52. In the embodiment shown in FIG. 3A, pivot arm 50 is spring biased to contact and remain engaged with beam 44.

Pivot arm 50 and joint 52 act as a lever and fulcrum to push and pull cables of linkage members 26a and 26b (FIG. 1). Thus, latching actuation mechanism 25 operates to latch and unlatch latching assemblies 27a and 27b (FIG. 1) as door 36A is pivoted. In the embodiment shown in FIG. 3A, when engine 10 is on the ground and door 36A of fan cowl 28 is opened, latching actuation mechanism 25 actuates latching assemblies 27a and 27b so that latching assemblies 27a and 27b are unlatched to allow maintenance personnel access. Latching actuation mechanism 25 automates standard steps a mechanic needs to perform in order to access core 16 and fan duct 34 for assembly, maintenance or engine removal and replacement. The addition of latching actuation mechanism 25 eliminates addition unlatching steps that would have had to be performed by the mechanic without the disclosed embodiment. Thus, the maintenance process is simplified and the total time of engine maintenance is reduced. The addition of latching actuation mechanism 25 also eliminates the risk of inadvertent human errors, for example, latching actuation mechanism 25 makes it impossible for the mechanic try to open thrust reverser cowl 30 (FIG. 1) with latching assembly 27b still engaged.

Figure 3B:
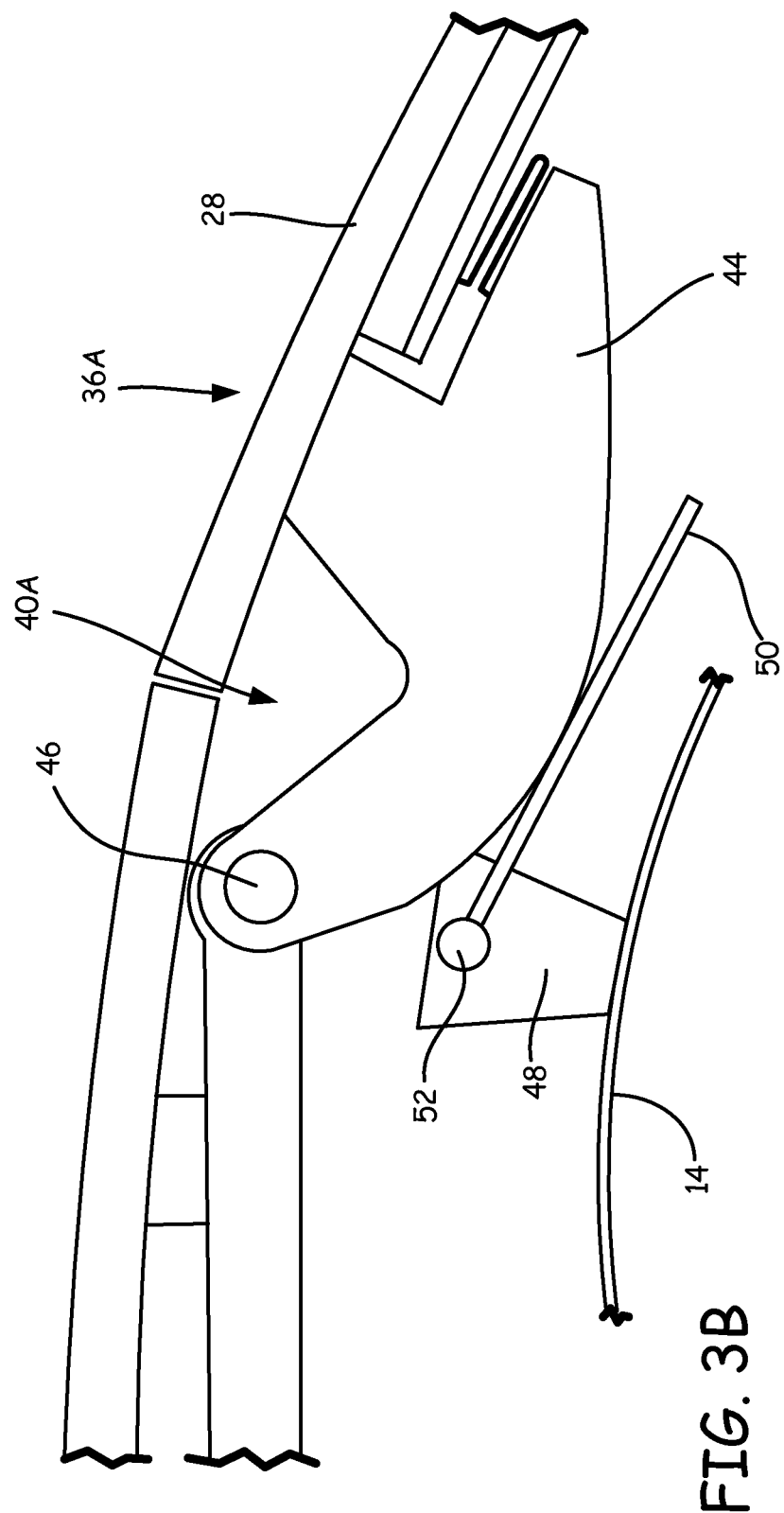
FIG. 3B is a plane view with the fan cowl lowered to a closed position and the latching actuation mechanism engaging the hinge.

FIG. 3B shows door 36A of fan cowl 28 is in the closed position. As shown in FIG. 3B, beam 44 has been pivoted on joint 46 to be disposed closer to fan case 14 then the embodiment of FIG. 3A. Bracket 48 remains mounted on the outer diameter of fan case 14 adjacent door 36A. Lever arm 50 has been pivoted relative to bracket 48 at joint 52 as a result of the movement of hinge 40A from the open position of FIG. 3A to the closed position of FIG. 3B. Thus, latching actuation mechanism 25 is movable in response to movement of hinge 40A. In the embodiment shown in FIG. 3B, pivot arm 50 is spring biased to contact and remain engaged with beam 44 of hinge 40A even when door 36A has been pivoted to the closed position. The FIGURES provide only a representative embodiment of components including latching actuation mechanism 25. In other embodiments, latching actuation mechanism 25 can comprise, for example, a linear system that translates in response to opening and closing of door 36A.

Pivot arm 50 and joint 52 act as a lever and fulcrum to push and pull cables of linkage members 26*a* and 26*b* (FIG. 1). Thus, latching actuation mechanism 25 operates to unlatch and latch latching assemblies 27*a* and 27*b* (FIG. 1) as door 36A is pivoted. In the embodiment shown in FIG. 3B, when door 36A of fan cowl 28 is closed, latching actuation mechanism 25 actuates latching assemblies 27*a* and 27*b* so latching assemblies 27*a* and 27*b* are latched.

Discussion of Possible Embodiments

The following are non-exclusive descriptions of possible embodiments of the present invention.

An assembly for a gas turbine engine includes a first fan cowl pivotable on a hinge from a first position to a second position. A latching actuation mechanism is disposed under the nacelle, engages the hinge, and is actuated by movement of the hinge between the first position and the second position.

The assembly of the preceding paragraph can optionally include, additionally and/or alternatively, any one or more of the following features, configurations and/or additional components:

the latching actuation mechanism includes a lever arm that engages the hinge;

the lever arm is spring loaded to engage the hinge;

the latching actuation mechanism pivots as the hinge pivots;

a fan case enclosed by the nacelle, the latching actuation mechanism is mounted to the fan case;

a latch assembly includes a latch movable between latched and unlatched positions, the latch maintaining engagement between a first nacelle structure and a second nacelle structure in the latched position, and movement of the latching actuation mechanism in response to the hinge rotates the latch between the latched position and the unlatched position;

the latch is in the unlatched position when the fan cowl is in the open position;

the latch is in the latched position when the fan cowl is in the closed position;

a fan exit guide vane, the latching actuation mechanism is connected to the latch through the fan exit guide vane; and at least one of the first nacelle structure and the second nacelle structure comprises a thrust reverser cowl.

A gas turbine engine includes a fan case, a nacelle, a latching actuation mechanism, and a latch. The nacelle includes a first fan cowl pivotable on a first hinge. Additionally, the nacelle includes a second fan cowl pivotable on a second hinge. The first and second hinges pivot the first and second fan cowls from a first position to a second position. The latching actuation mechanism is disposed between the fan case and the first fan cowl and engages the first hinge. The latching actuation mechanism is actuated in response to movement of the hinge between the first position and the second position. Movement of the latching actuation mechanism in response to the hinge rotates the latch between a latched position and an unlatched position.

The gas turbine of the preceding paragraph can optionally include, additionally and/or alternatively, any one or more of the following features, configurations and/or additional components:

the latching actuation mechanism includes a lever arm that engages the hinge;

the lever arm is spring loaded to engage the hinge;

the latching actuation mechanism pivots as the hinge pivots;

the latch latches and unlatches a thrust reverser cowl;

the latch is in the unlatched position when the first fan cowl is in the open position;

the latch is in the latched position when the fan cowl is in the closed position; and the latching actuation mechanism is connected to the latch through a fan exit guide vane.

A method of opening a nacelle includes pivoting a fan cowl on a hinge, actuating a latching actuation mechanism in response to the pivoting of the hinge of the fan cowl, and pivoting a latch from a latched position to an unlatched position in response to movement of the latching actuation mechanism.

The method of the preceding paragraph can optionally include, additionally and/or alternatively, any one or more of the following features, configurations and/or additional components:

spring loading the latching actuation mechanism to engage the hinge; and connecting the latching actuation mechanism to the latch through a fan exit guide vane.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of opening a nacelle, comprising:
   pivoting a fan cowl on a hinge;
   actuating a latching actuation mechanism in response to the pivoting of the hinge of the fan cowl; and
   pivoting a latch from a latched position to an unlatched position in response to movement of the latching actuation mechanism, wherein the latch is connected to the latching actuation mechanism through a fan exit guide vane, and wherein the latch is disposed radially inward of the fan exit guide vane.

2. The method of claim 1, further comprising spring loading the latching actuation mechanism to engage the hinge.

3. An assembly for a gas turbine engine, comprising:
   a first fan cowl pivotable on a hinge, wherein the hinge pivots the first fan cowl from a first position to a second position;

a latching actuation mechanism disposed under the first fan cowl and engaging the hinge, wherein the latching actuation mechanism is actuated by movement of the hinge between a first position and a second position; and a latch assembly connected to the latching actuation mechanism through a fan exit guide vane, wherein the latch assembly includes a latch disposed radially inward of the fan exit guide vane.

4. The assembly of claim 3, wherein the latching actuation mechanism includes a lever arm that engages the hinge.

5. The assembly of claim 4, wherein the lever arm is spring loaded to engage the hinge.

6. The assembly of claim 3, wherein the latching actuation mechanism pivots as the hinge pivots.

7. The assembly of claim 3, further comprising a fan case partially enclosed by the first fan cowl, wherein the latching actuation mechanism is mounted to the fan case.

8. The assembly of claim 3, wherein the latch of the latch assembly:

is movable between latched and unlatched positions, the latch maintaining engagement between a first nacelle structure and a second nacelle structure in the latched position, wherein movement of the latching actuation mechanism in response to the hinge rotates the latch between the latched position and the unlatched position.

9. The assembly of claim 8, wherein the latch is in the unlatched position when the first fan cowl is in an open position.

10. The assembly of claim 8, wherein the latch is in the latched position when the first fan cowl is in a closed position.

11. The assembly of claim 8, wherein at least one of the first nacelle structure and the second nacelle structure comprises a thrust reverser cowl.

12. A gas turbine engine comprising:

a fan case;

a nacelle enclosing the fan case and including a first fan cowl pivotable on a first hinge and a second fan cowl pivotable on a second hinge, wherein the first hinge and the second hinge pivot the first and the second fan cowls from a first position to a second position;

a latching actuation mechanism disposed between the fan case and the first fan cowl and engaging the first hinge, wherein the latching actuation mechanism is actuated in response to movement of the first hinge between the first position and the second position; and a latch movable between latched and unlatched positions, wherein movement of the latching actuation mechanism in response to the first hinge rotates the latch between the latched position and the unlatched position, and wherein the latch is disposed radially inward of a fan exit guide vane and connected to the latching actuation mechanism through the fan exit guide vane.

13. The gas turbine engine of claim 12, wherein the latching actuation mechanism includes a lever arm that engages the first hinge.

14. The gas turbine engine of claim 13, wherein the lever arm is spring loaded to engage the first hinge.

15. The gas turbine engine of claim 12, wherein the latching actuation mechanism pivots as the first hinge pivots.

16. The gas turbine engine of claim 12, wherein the latch latches and unlatches a thrust reverser cowl.

17. The gas turbine engine of claim 12, wherein the latch is in the unlatched position when the first fan cowl is in an open position.

18. The gas turbine engine of claim 12, wherein the latch is in the latched position when the first fan cowl is in a closed position.

\* \* \* \* \*